(12) United States Patent
Liu et al.

(10) Patent No.: US 11,703,966 B2
(45) Date of Patent: Jul. 18, 2023

(54) TOUCH DISPLAY MODULE

(71) Applicant: TPK Advanced Solutions Inc., Fujian (CN)

(72) Inventors: Ming Chung Liu, Miaoli County (TW); Yi Lung Yang, Taoyuan (TW); Ya Chin Chang, Taichung (TW); Po Yu Hsiao, Taoyuan (TW); Sheng Fa Liu, Taoyuan (TW); Wei Chou Chen, Taoyuan (TW); Xue Fen Wang, Taoyuan (TW); Yong Bin Ke, Xiamen (CN); Chia Jui Lin, Taoyuan County (TW); Shao Jie Liu, Xiamen (CN); Xue Long Zhang, Yingshang County (CN); Xian Bin Xu, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 176 days.

(21) Appl. No.: 17/405,196

(22) Filed: Aug. 18, 2021

(65) Prior Publication Data

US 2023/0064478 A1   Mar. 2, 2023

(51) Int. Cl.
  *G06F 3/041* (2006.01)
  *G02F 1/1333* (2006.01)
  *G02F 1/13363* (2006.01)
  *G02F 1/1335* (2006.01)

(52) U.S. Cl.
  CPC ........ *G06F 3/0412* (2013.01); *G02F 1/13338* (2013.01); *G02F 1/133528* (2013.01); *G02F 1/133638* (2021.01)

(58) Field of Classification Search
  CPC .............. G06F 3/0412; G06F 3/041; G06F 2203/04103; G02F 1/133528; G02F 1/133638; G02F 1/13338; G02F 1/133541
  See application file for complete search history.

(56) References Cited

U.S. PATENT DOCUMENTS

| 10,042,201 B2* | 8/2018 | Sakai ............... G02F 1/133536 |
| 2014/0098420 A1* | 4/2014 | Chung ................. G02B 5/3083 |
| | | 445/24 |
| 2018/0047945 A1* | 2/2018 | Hack ..................... H10K 50/86 |
| 2018/0157113 A1* | 6/2018 | Cheng ................. G02B 5/3058 |
| 2019/0227650 A1 | 7/2019 | Fang et al. |

FOREIGN PATENT DOCUMENTS

| CN | 101292362 A | 10/2008 |
| TW | I580995 B | 5/2017 |

* cited by examiner

*Primary Examiner* — Hang Lin
(74) *Attorney, Agent, or Firm* — Cooper Legal Group, LLC (57) ABSTRACT

A touch display module includes a touch device and a polarizing element. The polarizing element includes a polarizer and a retardation film assembly. The retardation film assembly has a polarization ellipticity value (e-value), and the absolute value of the e-value is greater than 0.8. A reflection rate of the polarizing element is less than 6%, and a total reflection rate of the touch device and the polarizing element is less than 7%.

20 Claims, 6 Drawing Sheets

TOUCH DISPLAY MODULE

BACKGROUND

Field of Disclosure

The present disclosure relates to a touch display module.

Description of Related Art

An organic light-emitting diode display is provided with advantages of low power consumption, high color vividness, and high contrast, which can provide people better visual enjoyment, but one of the biggest challenges is how to effectively inhibit reflected light caused from incident light of the external environment to reduce displaying issues. One of the solutions is to implement a circular polarizer as an anti-reflection film for reducing light quantity of reflective light after an ambient light is incident onto the display. The theoretical principle of the circular polarizer using with a quarter wave plate (QWP) and a linear polarizer is to circularly polarize an external ambient light incident on the display. The incident circularly polarized light (e.g., left-handed rotation light) will be reflected by the electrodes of the display and then reversely inverted into another circularly polarized light (e.g., right-handed rotation light) in an opposite polarized direction. The opposite circularly polarized light passes through the QWP again to transfer to a linearly polarized light that is orthogonal to the polarization direction of the linear polarizer. Therefore, the linearly polarized light orthogonal to the polarization direction of the linear polarizer cannot pass through the linear polarizer, thereby eliminating or reducing the reflecting light of external ambient light caused by electrodes, so as to avoid problems such as reflection interference or uneven brightness of the display screen. From the above-mentioned principle, the first step of the above-mentioned anti-reflection mechanism is to perform the circular polarization of the external ambient light by the anti-reflection film as one of the important factors of the anti-reflection effect. Generally speaking, with the same material, increasing the conversion rate of circular polarization can improve the anti-reflection effect.

As disclosed in TWI580995B (TW'995 hereinafter) of related art, an anti-ambient-light-reflection film including a linear polarization layer and a chiral liquid crystal layer is provided. Examples 1-4 in table II in TW'995 show that the lowest value of light reflection rate is 7.62% when the conversion rate of circular polarization is approximate to 1 (i.e., linearly polarized light being fully converted into circularly polarized lights). However, the present disclosure states that the increasingly sophisticated display requirements cannot be met when the reflection rate is around 8%, especially the current high-resolution, high-quality videos such as 4K and 8K that have been favored by users. On the other hand, the touch sensing electrode assembled on a display becomes one of the important human-machine interfaces in present society, and the touch sensing electrode is also a factor causing the reflection of ambient light. To sum up, the reflection rate of the anti-ambient-light-reflection film provided from TW'995 is excessively high, so the high-end display requirements cannot be satisfied after the display is assembled to the touch sensing electrode. In other words, how to obtain an anti-reflection sheet with lower reflection rate is actually a main task for those skilled in the art field.

On the other hand, the conversion rate of circular polarization from Examples 1-4 in TW'995 being approximate to 1, which is equivalent to an ideal value, is assumed to be a laboratory-grade liquid crystal material that is exceedingly costly and disadvantageous in commercial use. In the commercial market, due to cost considerations, the material specifications of electronic products will not be so approximate to the ideal value, that is, if considering general commercial specifications/costs, the conversion rate of circular polarization from Examples 1-4 in TW'995 has to decrease (e.g., the conversion rate of circular polarization is down to 0.9). It is conceivable that the aforementioned light reflection rate will also be increased as a result, so that the requirement for low reflection rate cannot be further satisfied.

Furthermore, the chiral liquid crystal layer used in TW'995 is a cholesteric liquid crystal, and the working principle thereof is to stack multiple liquid crystals with different axial directions to achieve circular polarization of light as shown in FIG. 2 of TW'995. Therefore, the multi-layer liquid crystal structure of TW'995 will cause a problem that the thickness of the anti-ambient light reflection film cannot be reduced, so the user's demand for light and thin portable devices cannot be met.

SUMMARY

A touch display module of an embodiment in the present disclosure may have a sufficiently low reflection rate, thereby reducing the reflective light from the external environment, and avoiding affecting the display quality.

A technical solution adopted in this present disclosure is as follows.

One aspect of the present disclosure is to provide a touch display module. According to one or more embodiments of the present disclosure, a touch display module includes a touch device and a polarizing element. The polarizing element is disposed on the touch device. The polarizing element includes a linear polarizer and a retardation film assembly. When an ambient light passes through the linear polarizer to generate a linearly polarized light, the linearly polarized light is converted into a circularly polarized light through the retardation film assembly. A ratio of the linearly polarized light converted into the circularly polarized light is defined as a polarization ellipticity value of the retardation film assembly. An absolute value of the polarization ellipticity value is greater than 0.8 in a wavelength range of 450 nm to 650 nm. A reflection rate of the ambient light passing through the polarizing element is less than 6% in the wavelength range of 450 nm to 650 nm.

According to one or more embodiments of the present disclosure, the touch device includes a touch sensor. The touch sensor includes at least one of silver nanowires or polymer films, and the touch sensor is disposed on the linear polarizer or the retardation film assembly.

According to one or more embodiments of the present disclosure, a combination of the touch device and the polarizing element has a total reflection rate in the wavelength range of 450 nm to 650 nm, and the total reflection rate is less than 7% or less than 6%; or in the wavelength range of 450 nm to 650 nm, a reflectivity change rate that is achieved before and after the polarizing element is combined with the touch device is in a range of 0% to 15%, a range of 0% to 13%, a range of 0% to 8%, or a range of 0% to 2%.

According to one or more embodiments of the present disclosure, the retardation film assembly is made of a positive dispersion half wave plate and a positive dispersion typed quarter wave plate.

According to one or more embodiments of the present disclosure, an optical axis angle of the positive-dispersion-type half wave plate relative to the linear polarizer is in a range of 10° to 15°, and an optical axis angle of the positive-dispersion-type quarter wave plate relative to the linear polarizer is in a range of 65° to 75°.

According to one or more embodiments of the present disclosure, the retardation film assembly includes a reverse-dispersion-type quarter wave plate.

According to one or more embodiments of the present disclosure, an optical axis angle of the reverse-dispersion-type quarter wave plate relative to the linear polarizer is 45°.

According to one or more embodiments of the present disclosure, the retardation film assembly comprises a liquid crystal type retardation film or a polymer film type retardation film.

According to one or more embodiments of the present disclosure, the absolute value of the polarization ellipticity value is in a range of 0.8 to 0.95 in a wavelength range of 450 nm to 650 nm. The reflection rate of the ambient light passing through the polarizing element is less than 5.5% in the wavelength range of 450 nm to 650 nm.

One aspect of the present disclosure is to provide a touch display module. According to one or more embodiments of the present disclosure, a touch display module includes a touch device and a polarizing element. The polarizing element is disposed on the touch device. The polarizing element includes a linear polarizer and a retardation film assembly. When an ambient light passes through the linear polarizer to generate a linearly polarized light, the linearly polarized light is converted into a circularly polarized light through the retardation film assembly. A ratio of the linearly polarized light converted into the circularly polarized light is defined as a polarization ellipticity value of the retardation film assembly. An absolute value of the polarization ellipticity value is greater than 0.9 in a wavelength of 550 nm, and a reflection rate of the ambient light passing through the polarizing element is less than 5% in a wavelength of 550 nm.

Thus, through the embodiments of the present disclosure, the polarization ellipticity value of the polarizing element is not necessary to be approximate to the theoretical value, so that the touch display module can reduce the reflection of incident light from the external environment, thereby improving the visual and operating experience of the touch display module, but not excessively increasing product costs.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Regarding a display device, light reflected from the external environment will affect user's visual experience. For a touch display module's user, the reflection of external ambient light will further affect the operating experience. While the wavelength range of the external ambient light is very wide, the present disclosure is aimed at the optical adjustment of anti-reflection in the wavelength band to which a human eye is sensitive (i.e., 450 nm-650 nm).

The disclosure is related to a touch display structure, which can reduce the reflection of external ambient light, thereby reducing the interference on the visual and operating experience from the reflection of the external ambient light and maintaining low thickness. The present disclosure does not have to reach or approach an ideal polarization ellipticity value (that is, the polarization ellipticity value is equal to 1) for the polarizing element in the touch display structure to obtain an anti-reflection element with low reflectivity. Therefore, an excellent balance can be made between cost and product quality.

Figure 1:
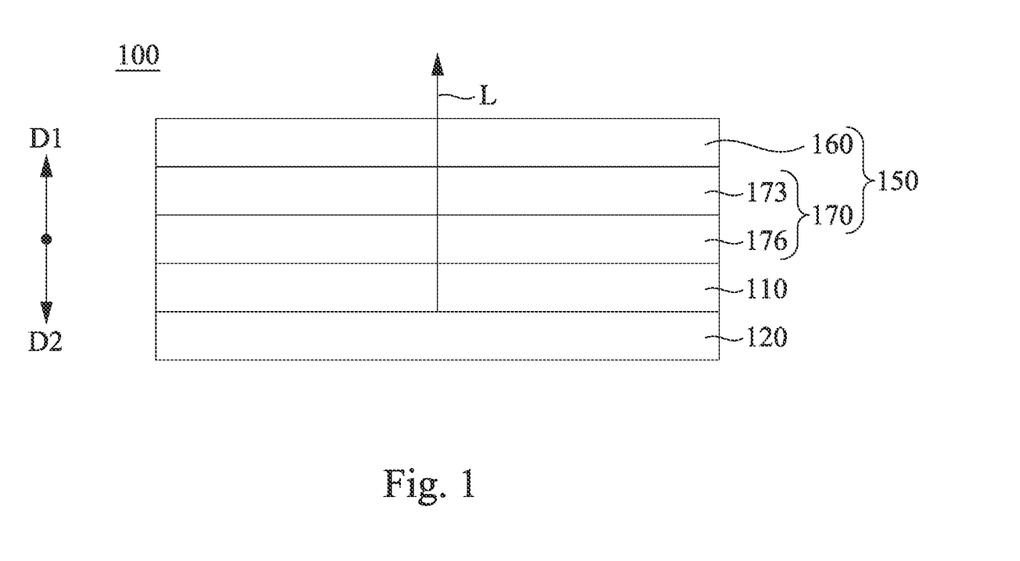
FIG. 1 is a cross-sectional schematic view of a touch display module according to one embodiment of the present disclosure.

Referring to FIG. 1, FIG. 1 is a cross-sectional schematic view of a touch display module 100 according to one embodiment of the present disclosure. As shown in FIG. 1, in one embodiment of the present disclosure, a touch display module 100 at least includes a touch device 110 and a polarizing element 150.

In this embodiment, the touch device 110 can be assembled with a display unit 120. For example, the touch device 110 and the display unit 120 are bonded together by optical adhesives (OCA).

In some embodiments, the display unit 120 can be an organic light-emitting diode (OLED), a miniature light-emitting diode (mini-LED) display, or the like. An organic light-emitting diode display is provided with advantages of low power consumption, high color vividness, and high contrast. In some embodiments, one or more organic light-emitting diodes of the display unit 120 can form an active-matrix organic light-emitting diode (AMOLED) so as to display images and signals.

As shown in FIG. 1, in one embodiment of the present disclosure, the display unit 120 is able to emit light L in a direction D1 so as to display a screen accordingly; that is, the user can receive signals transmitted from the display unit 120 in the direction D1.

In some embodiments, the touch device 110 may include a touch sensor. The touch sensor can sense touching or gestures of the user, so as to realize the touch operation of the touch display module 100.

In some embodiments of the present disclosure, the touch device 110 includes electrodes patterned by transparent conductive layers or transparent conductive films, which is provided with high transmittance. For example, the light transmission of visible light (e.g., wavelength of 400 nm to 700 nm) is greater than about 88%, 90%, 91%, 92%, 93%, or more. In some embodiments, one of the transparent conductive layer or the transparent conductive film includes indium tin oxide (ITO) materials, silver nanowires (SNW) materials, or the like.

Referring back to FIG. 1, as shown in FIG. 1, the polarizing element 150 is disposed on the touch device 110. In some embodiments of the present disclosure, the polarizing element 150 is able to convert ambient light (e.g., light L1 in FIG. 2) from the external environment into polarized light, thereby reducing the reflected light from the ambient light and emitted outwards in the direction D1 so as to affect the user when viewing the screen. For more details, please see descriptions mentioned below.

As shown in FIG. 1, the polarizing element 150 includes a linear polarizer 160 and a retardation film assembly 170. In the embodiment, the retardation film assembly 170 is disposed between a light emitting surface of the touch device 110 (e.g., optical touch structure) and the linear polarizer 160.

The linear polarizer 160 can be configured to convert passing light into linearly polarized light. In some embodiments of the present disclosure, the degree of polarization (DOP) of the linear polarizer 160 is greater than 98%, but the disclosure is not limited thereto.

In some embodiments, the retardation film assembly 170 includes one or more retarders. In this embodiment, the retardation film assembly 170 is made of a positive-dispersion-type half wave plate (HWQ) 173 and a positive-dispersion-type quarter wave plate (QWP) 176. In this embodiment, each of the QWP 176 and the HWQ 173 is a single-layer liquid crystal coating layer. For example, the QWP 176 and the HWQ 173 are commercially available products: (e.g., manufacturer: DNP, commercial product: DNP_HWP and DNP_QWP) which are made of Reactive Mesogen (RM) liquid crystal.

In this way, the retardation film assembly 170 can be regarded as a coating type retardation element of liquid crystal. Since the thickness of the liquid crystal is only a few microns (μm), the overall thickness can be reduced. Compared with the laminated thickness of the multilayer cholesteric liquid crystal used in TW'995 of the related art, the RM used in this embodiment only needs to be coated with one layer to achieve the retarding light phase effect so as to satisfy the demand of thin-type products.

Figure 2:
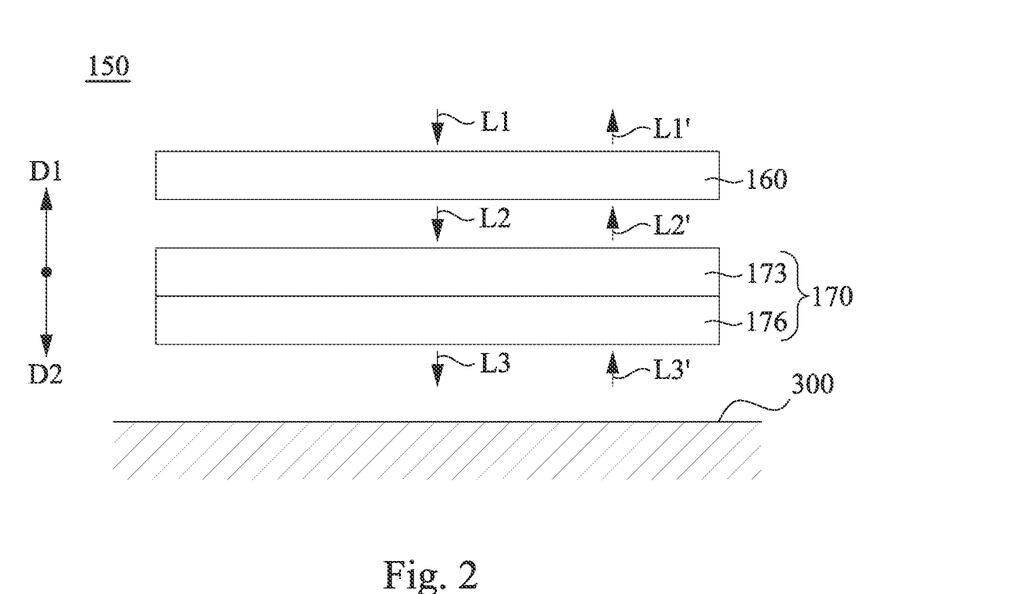
FIG. 2 is a disassembling schematic view of a polarizing element according to one embodiment of the present disclosure.

Please refer to FIG. 2. When the external ambient light L1 is incident, the light is approximately incident along a direction D2 facing away from the direction D1 (i.e., the directions illustrated in figures), and the external ambient light is converted into linearly polarized light L2 by the linear polarizer 160. The linearly polarized light L2 passes through the HWQ 173 and the QWP 176 to be converted into circularly polarized light L3 (e.g., left-handed rotation light). When the circularly polarized light L3 is reflected by the touch device 110 or the display unit 120, a reverse circularly polarized light L3' (e.g., right-handed rotation light) that is opposite to the circularly polarized light L3 is formed. At this time, the reverse circularly polarized light L3' passes through the retardation film assembly 170 to form a linearly polarized light L2' perpendicular to the optical axis of the linear polarizer 160. Since the polarization angle is orthogonal to the optical axis of the linear polarizer 160, the linearly polarized light L2' cannot be emitted outwards from the linear polarizer 160; that is, a reflected light L1' will not be generated under an ideal condition. In this way, the polarizing element 150 in optical properties is called as a circular polarizer (CPOL), which can eliminate or reduce reflected light in optical applications, so the polarizing element 150 is also called an anti-reflection element.

In brief, by the polarizing element 150, the external ambient light is converted into circularly polarized light, and then the circularly polarized light is reflected again. Due to the polarization angle, the reflected circularly polarized light will be blocked by the linear polarizer 160. In this way, the reflection of external ambient light can be prevented from affecting the visual effect of the touch display module 100. It is noted, the linearly polarized light can be converted into ideal completely circularly polarized light or elliptical polarized light being approximate to the circularly polarized light through the polarizing element 150. In this way, a polarization ellipticity value (e-value) of the retardation film assembly 170 can be defined according to the ratio of linearly polarized light L2 being converted into the circularly polarized light. The polarization ellipticity value (e-value) has a positive/negative numeric value according to the left-handed or right-handed rotation. For the convenience of explanation, the polarization ellipticity value (e-value) of the present disclosure will be illustrated by absolute value.

For example, when the circularly polarized light L3 is right-handed circularly polarized light, the polarization ellipticity value (e-value) of the retardation film assembly 170 is +1 (i.e., complete conversion); when the circularly polarized light L3 is right-hand rotation of the elliptical polarized light, that is, a combination of a part of linearly polarized light and a part of circularly polarized light, the polarization ellipticity value (e-value) of the retardation film assembly 170 is between −1 and 0. In general, when the linearly polarized light is completely converted into circularly polarized light, the absolute value of the polarization ellipticity value (e-value) is equal to 1.

In some embodiments, the absolute value of the polarization ellipticity value (e-value) of the retardation film assembly 170 is less than 1; in other words, it can provide anti-reflection effect, but does not need to be close to the ideal polarization ellipticity value (e.g., the ideal e-value is 1). Specifically, in some embodiments, in a wavelength range of 450 nm to 650 nm, as long as the absolute value of the polarization ellipticity value (e-value) of the retardation film assembly 170 is greater than 0.8 (not necessarily close to the ideal e-value), the overall reflectivity of the touch display module 100 still can be effectively reduced. The reflectivity, for example, is less than 6% or less than 5.5%.

In order to further illustrate that when the absolute value of the polarization ellipticity value (e-value) of the retardation film assembly 170 is greater than 0.8, but does not need to be close to the complete polarization ellipticity value (e-value), the overall reflectivity of the touch display module 100 still can be effectively reduced.

Figure 3:
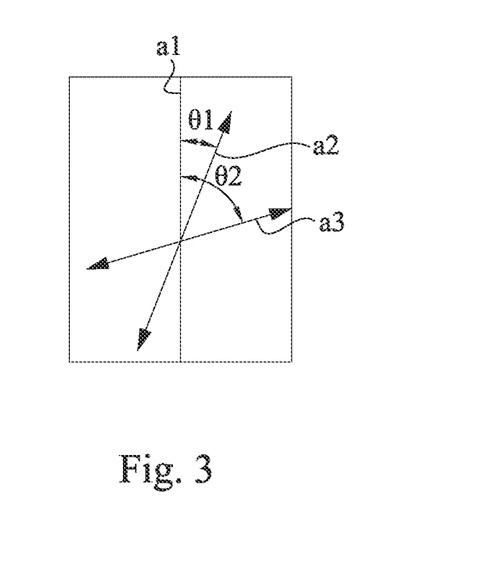
FIG. 3 is a schematic view of optical-axis included angles formed by a polarizing element according to one embodiment of the present disclosure.

FIG. 3 is a schematic view of optical-axis included angles θ1, θ2 formed by a polarizing element 150 according to one embodiment of the present disclosure. As shown in FIG. 3, an optical axis a1 corresponds to the linear polarizer 160. For the polarizing element 150, an optical axis a2 corresponds to the HWQ 173 of a coating type liquid crystal having a positive dispersion, and an optical axis a3 corresponds to the QWP 176 of the coating type liquid crystal having a positive dispersion. Since the HWQ 173 and the QWP 176 are liquid crystal materials, each of the HWQ 173 and the QWP 176 has one unique optical axis, respectively. In the embodiment, the optical axis a2 and the optical axis a3 mean slow axes of the elements.

As shown in FIG. 3, the angle between the optical axis a1 of the linear polarizer 160 and the optical axis a2 is the angle θ1. The angle between the optical axis a1 of the linear polarizer 160 and the optical axis a3 is the angle θ2. In some embodiments, the range of each of the angles θ1, θ2 may be between 0° and 180°. In this embodiment, the angle θ1 is 15°, and the angle θ2 is 75°, but the disclosure is not limited thereto. In one embodiment, the angle θ1 is in a range of 10° to 15°, and the angle θ2 is in a range of 65° to 75°, but the disclosure is not limited thereto.

Figure 4:
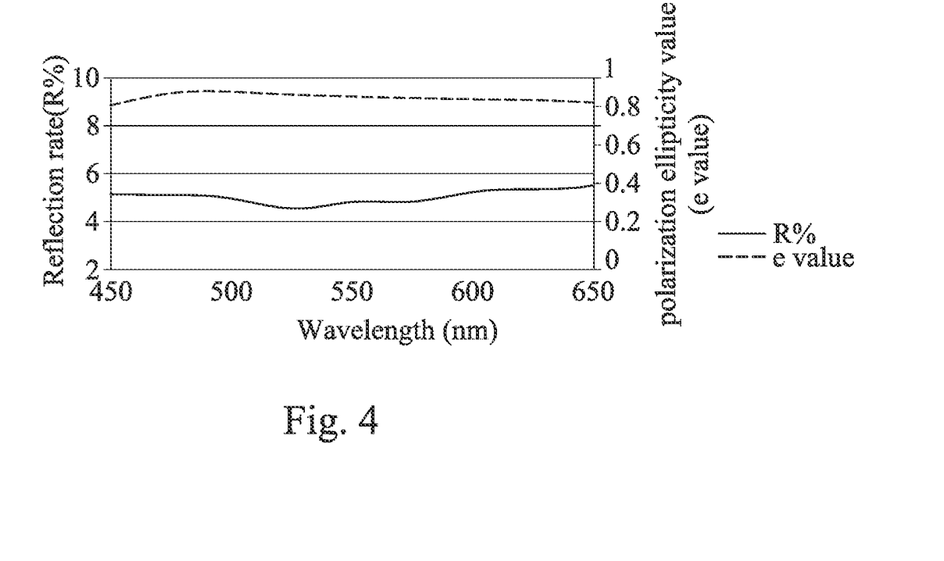
FIG. 4 is a relation chart between a polarization ellipticity value and a reflection rate of a polarizing element according to one embodiment of the present disclosure.

Referring back to FIG. 2, FIG. 2 is a schematic view of a testing apparatus. An incident light L1 is incident into a polarizing element 150, reflected back into the polarizing element 150 by a reflective surface 300 with a reflectivity of about 50-60%, and then passed through the polarizing element 150 to form a reflected light L1' according to one embodiment of the present disclosure. The reflective surface 300, for example, is a semi-reflecting mirror (e.g., manufacturer: 3D Lens). FIG. 4 is a relation chart between a reflection rate (%) and an absolute value of a polarization ellipticity value (e-value) of the polarizing element 150 measured in the aforementioned embodiment of the present disclosure.

As shown in FIG. 4 and Table 1 below, corresponding to incident light L1 with wavelength in the range of 450 nm to 650 nm, the absolute values of the polarization ellipticity value (e value) of the polarizing element 150 of the present disclosure are all above 0.8, as indicated by a dotted line. Corresponding to incident light L1' with wavelength in the range of 450 nm to 650 nm, the reflection rate (R %) is less than 6%, or less than 5.5%.

TABLE 1

| Wavelength (nm) | e value | Reflection rate (R %) |
| --- | --- | --- |
| 450 | 0.85 | 5.2 |
| 475 | 0.91 | 5.2 |
| 500 | 0.92 | 5.0 |
| 525 | 0.92 | 4.6 |
| 550 | 0.9 | 4.9 |
| 575 | 0.89 | 4.9 |
| 600 | 0.87 | 5.2 |
| 625 | 0.85 | 5.4 |
| 650 | 0.82 | 5.5 |

Thus, corresponding to the incident light L1 in a wavelength range of 450 nm to 650 nm, the absolute values of the polarization ellipticity value (e value) of the polarizing element 150 of the embodiment are all above 0.8, while the reflection rate (R %) of the polarizing element 150 in the wavelength range of 450 nm to 650 nm, to which a human eye is sensitive, is less than 6%, or less than 5.5%. More specifically, corresponding to the incident light L1 in a wavelength range of 450 nm to 650 nm, the absolute values of the polarization ellipticity value (e value) of the polarizing element 150 of the embodiment only need to be in the range of 0.82 to 0.92, but not necessary to be approximate to the theoretical value (i.e., ideal e value=1), and the reflection rate (R %) in the wavelength range of 450 nm to 650 nm can be less than 6%, or less than 5.5%, so it is advantageous in commercial/industrial production costs. In one embodiment, the absolute values of the polarization ellipticity value (e value) of the polarizing element 150 only need to be in a range between 0.8 and 0.95, but not necessary to be approximate to the theoretical value (i.e., e value=1), and the reflection rate in the range of 450 nm to 650 nm is less than 6%, or less than 5.5%.

More specifically, as the incident wavelength of incident light L1 is 550 nm, the absolute value of the polarization ellipticity value (e value) of the polarizing element 150 of this embodiment only needs to be 0.9 or more, but not necessary to be approximate to the theoretical value (i.e., e value=1), and the reflection rate (R %) in the wavelength range of 550 nm can be less than 6%, or less than 5.5%, or less than 5%. More specifically, corresponding to the incident light L1 in a wavelength range of 550 nm, the absolute value of the polarization ellipticity value (e value) of the polarizing element 150 of the embodiment only needs to be 0.92 or more, but not necessary to be approximate to the theoretical value (i.e., e value=1), and the reflection rate (R %) in the wavelength range of 550 nm can be 4.9%. As a result, it is advantageous in commercial/industrial production costs. To sum up, the absolute value of the polarization ellipticity value (e value) of the polarizing element 150 of this embodiment only needs to be 0.9 to 0.95 in a wavelength of 550 nm, but not necessary to be approximate to the theoretical value (i.e., e value=1), so that the reflection rate (R %) in the wavelength range of 550 nm to which a human eye is sensitive can be 4.5-5.0%.

Figure 5:
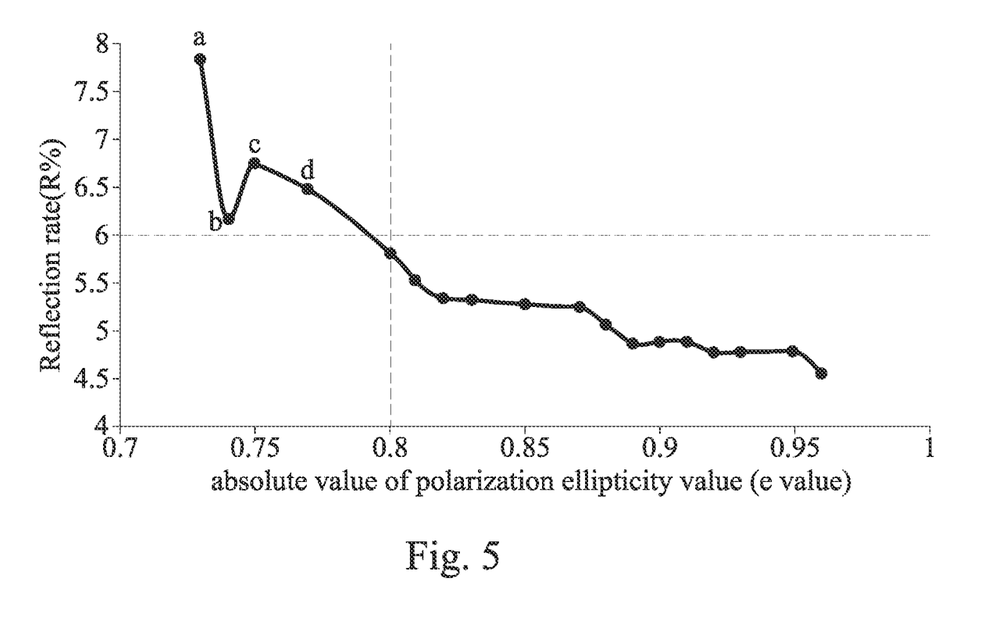
FIG. 5 is a relation chart between an absolute value of a polarization ellipticity value and a reflection rate.

FIG. 5 is a relation chart between an absolute value of a polarization ellipticity value (e value) and a reflection rate. Under an incident light in the range of 450 nm to 650 nm, the horizontal axis in FIG. 5 is arranged to represent the liquid crystal coating type of retardation film assemblies with different absolute values of the polarization ellipticity value (e value) of the present disclosure, and the vertical axis in FIG. 5 is arranged to represent different reflection rates (R %) of corresponding polarizing elements of the retardation film assembly. The relation chart indicates that once the absolute value of the polarization ellipticity value (e value) is greater than 0.8, when the incident light is in the range of 450 nm to 650 nm, it can ensure that the reflection rate (R %) of the polarizing element is less than 6%. On the other hand, when an included angle between the slow axis of the HWQ 173 and the optical axis a1 of the linear polarizer 160 is greater than 15°, or when an included angle between the slow axis of the QWP 176 and the optical axis a1 of the linear polarizer 160 is greater than 75°, it is possible to cause that the absolute value of the polarization ellipticity value (e value) to be less than 0.8, and the reflection rate (R %) (see data points a, b, c, d, FIG. 5) of the polarizing element in the wavelength range of 450 nm to 650 nm to be greater than 6%, which can't meet the requirement. The other data points in FIG. 5 are all satisfied by the foregoing embodiment, and will not be repeated here.

According to one embodiment of the present disclosure, after the touch device 110 is assembled to the aforementioned polarizing element 150, a test for measuring the polarization ellipticity value (e value) and the light reflection rate in the wavelength range of 450 nm to 650 nm is performed. In one embodiment, a combination of the touch device 110 and the polarizing element 150 can be integrated as an optoelectronic element, that is, an integrated element having both optical and electrical functions. The aforementioned electrical function here refers to a touch sensing function, and the aforementioned optoelectronic element has a total reflection rate. Since the touch device 110 also will cause light reflection, the total reflection rate of the type of the optoelectronic element will be slightly greater than the total reflection rate of the polarizing element 150, and the total reflection rate of the product must be small enough to not affect its display quality. The foregoing related description shown in FIG. 2 can be referred to for the test method of this embodiment, and the test method will not be repeated here.

Figure 6:
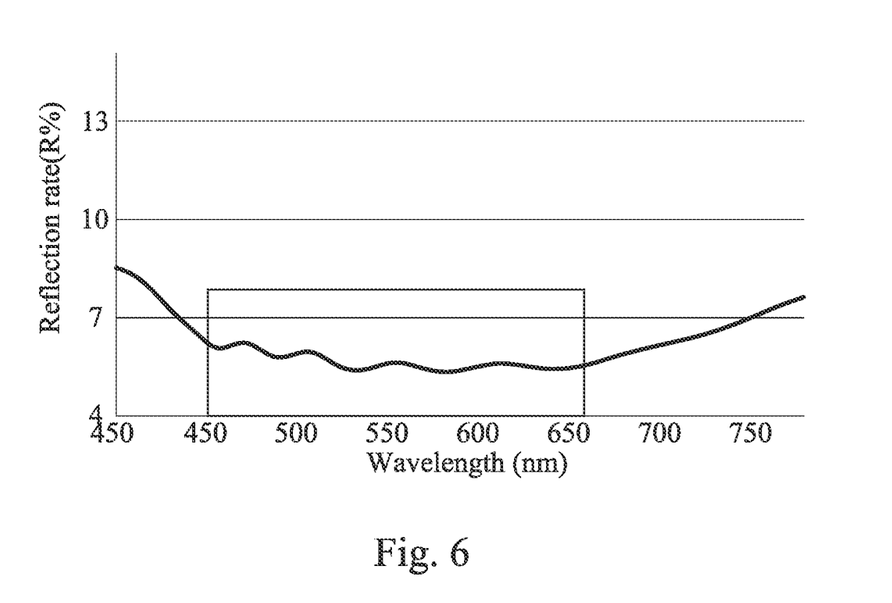
FIG. 6 is a relation chart of a touch display module corresponding to different incident wavelengths and relevant reflection rate according to one embodiment of the present disclosure.

In one embodiment, the touch device 110 at least includes touch electrodes that include silver nanowires and/or polymer films. A specific method thereof can be referred to and introduced/incorporated by overall descriptions of US 20190227650A, CN 101292362, and the like. As shown in FIG. 6, the total reflection rate of the integrated element of the touch device 110 and the polarizing element 150 can be less than 7% in the wavelength range of 450 nm to 650 nm to which a human eye is sensitive, as shown in Table 2 below.

TABLE 2

| wavelength (nm) | reflection rate (R %) | reflectivity change rate (%) |
|---|---|---|
| 450 | 5.9 | 13 |
| 475 | 5.8 | 12 |
| 500 | 5.6 | 12 |
| 525 | 5.2 | 13 |
| 550 | 5.3 | 8 |
| 575 | 5.3 | 8 |
| 600 | 5.3 | 2 |
| 625 | 5.4 | 0 |
| 650 | 5.3 | −4* |

*Note:
experimental figure caused by instrument errors

As shown in the above table, corresponding to the incident light L1 in a wavelength range of 450 nm to 650 nm, the reflection rate of the optoelectronic element of the embodiment in the wavelength range of 450 nm to 650 nm is less than 7%, or less than 6%. In general, the reflection rate of the optoelectronic element of the embodiment in the wavelength range of 450 nm to 650 nm is in a range of 5% to 6%.

More specifically, corresponding to the incident light L1 in a wavelength range of 550 nm, the reflection rate of the optoelectronic element of the embodiment in the wavelength of 550 nm is less than 6%, or less than 5.5%. Even more specifically, corresponding to the incident light L1 in a wavelength range of 550 nm, the reflection rate of the optoelectronic element of the embodiment in the wavelength of 550 nm is 5.3%. In general, the reflection rate of the optoelectronic element of the embodiment in the wavelength of 550 nm is in a range of 5.0% to 5.5%.

Furthermore, when two components having different functions are assembled together, the characteristics of the components normally will be affected by each other. According to the embodiment of the present disclosure, it can be found that when the touch electrodes comprising silver nanowires and/or polymer films are assembled with the aforementioned polarizing element 150, the characteristic of the aforementioned polarizing element 150 will not be excessively deteriorated. Specifically, in the embodiment of the present disclosure, when the touch electrodes comprising silver nanowires and/or polymer films being assembled with the aforementioned polarizing element 150 are compared with the aforementioned polarizing element 150 not yet assembled with the touch electrodes, the reflectivity change rate is less than 15% in the wavelength range of 450 nm to 650 nm. In general, the reflectivity change rate of the optoelectronic element of the embodiment of the present disclosure in the wavelength range of 450 nm to 650 nm is in a range of 0% to 15%, a range of 0% to 13%, a range of 0% to 8%, or a range of 0% to 2%.

More specifically, when corresponding to the wavelength of 550 nm, the reflectivity change rate is less than 10%; more specifically, when corresponding to the wavelength of 550 nm, the reflectivity change rate is less than 8%. To sum up, when corresponding to the wavelength of 550 nm, a reflectivity change rate of the photoelectric element of the embodiment of the present disclosure in the wavelength range of 450 nm to 650 nm is in a range of 0% to 10%, a range of 5% to 10%, or a range of 5% to 8%.

In some embodiments, a transparent protective cover can be further provided on the polarizing element 150.

Figure 7:
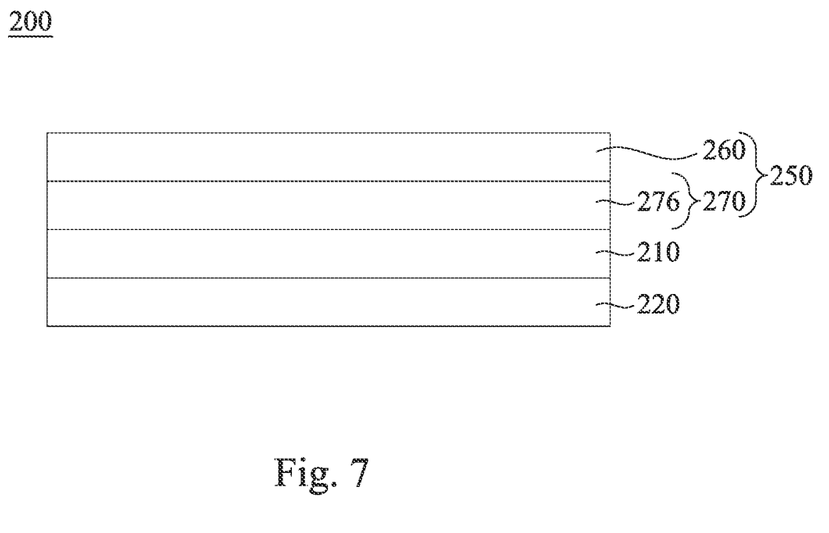
FIG. 7 is a cross-sectional schematic view of a touch display module according to one embodiment of the present disclosure.

FIG. 7 is a cross-sectional schematic view of a touch display module 200 according to one embodiment of the present disclosure.

In this embodiment, as shown in FIG. 7, the touch display module 200 includes an optical touch element 210 and a polarizing element 250, and the polarizing element 250 includes a polarizer 260 and a liquid crystal coating type of a retardation film assembly 270.

The difference from the foregoing embodiment is at least that the retardation film assembly 270 may include a retarder. In this embodiment, the retardation film assembly 270 has a reverse-dispersion-type quarter wave plate (QWP) 276. In this embodiment, the QWP 276 is a single-layer liquid crystal coating layer. For example, the QWP 276 (e.g., manufacturer: DNP; commercial product: DNP_QWP) is a commercially available product of Reactive Mesogen (RM) liquid crystal. In this embodiment, the QWP 276 has a single optical axis, and an optical axis included angle is formed between the optical axis (for example, the slow axis) of the QWP 276 and the optical axis of the polarizer 260. In some embodiments, the aforementioned optical axis included angle has a range of 0° to 180°. In some embodiments, the aforementioned optical axis included angle is 45°. In some embodiments, the aforementioned optical axis included angle has a range of 40° to 50°.

In this embodiment, in the incident wavelength range of 450 nm to 650 nm, the retardation wavelength of the QWP 276 is between 100 nm and 160 nm.

In addition, as in the previous embodiment, the QWP 276 in the incident wavelength range of 450 nm to 650 nm has an absolute value that is less than 0.8, or a polarization ellipticity value (e value) that is between 0.82 and 0.92, but not necessary to be approximate to the theoretical value (i.e., e value=1). In this way, it can ensure that the reflection rate (R %) of the polarizing element 250 is less than 6% or less than 5.5%, and the total reflection rate of the polarizing element 250 and the optical touch element 210 is less than 7%. Alternatively, the optical characteristics of the QWP 276 described in this embodiment and the optical characteristics of the QWP 276 being assembled with the optical touch element are the same as those in the foregoing embodiment and will not be repeated here.

In another embodiment of the present disclosure, the polarizing element 250 may also include a polymer film type QWP, or a combination of a polymer film type QWP and a polymer film type HWP. The polymer film material can be: PC (Polycarbonate), CPI (Colorless Polyimide), COP (Cyclo Olefin Polymer), etc. In other words, regardless of the material or laminate of the polarizing element 250, the present disclosure can be implemented as long as it is the same as the foregoing embodiments.

In summary, the present disclosure provides a touch display module including a polarizing element with a reflection rate that is less than 6% or less than 5.5%. The polarizing element is implemented with a liquid crystal coating type of a retardation film assembly so that the overall thickness thereof can be reduced. In addition, the absolute value of the polarization ellipticity value (e value) of the liquid crystal coating typed retardation film assembly is greater than 0.8 but not necessary to be approximate to the ideal value, so that reflected light of the touch display module can be reduced by converting the linearly polarized light that has passed through the polarizing element into circularly polarized light or close to circularly polarized light. In addition, the total reflection rate of the polarizing element and the touch device can be less than a specific value in a wavelength range to which a human eye is sensitive, for example, the total reflection rate is less than 7% or less than 6%, for improving the visual and operating experience of the touch display module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A touch display module, comprising:
   a touch device; and
   a polarizing element disposed on the touch device, the polarizing element comprising:
     a linear polarizer; and
     a retardation film assembly, wherein when an ambient light passes through the linear polarizer to generate a linearly polarized light, the linearly polarized light is converted into a circularly polarized light through the retardation film assembly, wherein a ratio of the linearly polarized light that is converted into the circularly polarized light is defined as a polarization ellipticity value of the retardation film assembly,
     wherein an absolute value of the polarization ellipticity value is greater than 0.8 in a wavelength range of 450 nm to 650 nm, and
     wherein a reflection rate of the ambient light passing through the polarizing element is less than 6% in the wavelength range of 450 nm to 650 nm.

2. The touch display module of claim 1, wherein the touch device comprises:
   a touch sensor comprising at least one of silver nanowires or polymer films, and wherein the touch sensor is disposed on the linear polarizer or the retardation film assembly.

3. The touch display module of claim 2, wherein a combination of the touch device and the polarizing element has a total reflection rate in the wavelength range of 450 nm to 650 nm, and the total reflection rate is less than 7% or less than 6%; or
   in the wavelength range of 450 nm to 650 nm, a reflectivity change rate that is achieved before and after the polarizing element is combined with the touch device is in a range of 0% to 15%, a range of 0% to 13%, a range of 0% to 8%, or a range of 0% to 2%.

4. The touch display module of claim 1, wherein the retardation film assembly is made of a positive-dispersion-type half wave plate and a positive-dispersion-type quarter wave plate.

5. The touch display module of claim 4, wherein an optical axis angle of the positive-dispersion-type half wave plate relative to the linear polarizer is in a range of 10° to 15°, and an optical axis angle of the positive-dispersion-type quarter wave plate relative to the linear polarizer is in a range of 65° to 75°.

6. The touch display module of claim 1, wherein the retardation film assembly comprises a reverse-dispersion-type quarter wave plate.

7. The touch display module of claim 6, wherein an optical axis angle of the reverse-dispersion-type quarter wave plate relative to the linear polarizer is 45°.

8. The touch display module of claim 6, wherein the reverse-dispersion-type quarter wave plate is a Cyclo Olefin Polymer (COP).

9. The touch display module of claim 1, wherein the retardation film assembly comprises a liquid crystal type retardation film or a polymer film type retardation film.

10. The touch display module of claim 1, wherein the absolute value of the polarization ellipticity value is in a range of 0.8 to 0.95 in a wavelength range of 450 nm to 650 nm, and
    wherein the reflection rate of the ambient light passing through the polarizing element is less than 5.5% in the wavelength range of 450 nm to 650 nm.

11. A touch display module, comprising:
    a touch device; and
    a polarizing element disposed on the touch device, the polarizing element comprising:
      a linear polarizer; and
      a retardation film assembly, wherein when an ambient light passes through the linear polarizer to generate a linearly polarized light, the linearly polarized light is converted into a circularly polarized light through the retardation film assembly, wherein a ratio of the linearly polarized light converted into the circularly polarized light is defined as a polarization ellipticity value of the retardation film assembly,
      wherein an absolute value of the polarization ellipticity value is greater than 0.9 in a wavelength of 550 nm, and
      wherein a reflection rate of the ambient light passing through the polarizing element is less than 5% in the wavelength of 550 nm.

12. The touch display module of claim 11, wherein the touch device comprises:
    a touch sensor comprising at least one of silver nanowires or polymer films, and wherein the touch sensor is disposed on the linear polarizer or the retardation film assembly.

13. The touch display module of claim 12, wherein a combination of the touch device and the polarizing element has a total reflection rate in the wavelength of 550 nm, and the total reflection rate is less than 6% or less than 5.5%; or in the wavelength of 550 nm, a reflectivity change rate that is achieved before and after the polarizing element is combined with the touch device is in a range of 0% to 10%, a range of 5% to 10%, or a range of 5% to 8%.

14. The touch display module of claim 11, wherein the retardation film assembly is made of a positive-dispersion-type half wave plate and a positive-dispersion-type quarter wave plate.

15. The touch display module of claim 14, wherein an optical axis angle of the positive-dispersion-type half wave plate relative to the linear polarizer is in a range of 10° to 15°, and an optical axis angle of the positive-dispersion-type quarter wave plate relative to the linear polarizer is in a range of 65° to 75°.

16. The touch display module of claim 11, wherein the retardation film assembly comprises a reverse-dispersion-type quarter wave plate.

17. The touch display module of claim 16, wherein an optical axis angle of the reverse-dispersion-type quarter wave plate relative to the linear polarizer is 45°.

18. The touch display module of claim 16, wherein the reverse-dispersion-type quarter wave plate is a Cyclo Olefin Polymer (COP).

19. The touch display module of claim 11, wherein the retardation film assembly comprises a liquid crystal type retardation film or a polymer film type retardation film.

20. The touch display module of claim 11, wherein the absolute value of the polarization ellipticity value is in a range of 0.9 to 0.95 in the wavelength of 550 nm, and
wherein the reflection rate of the ambient light passing through the polarizing element is in a range of 4.5 to 5.0% in the wavelength of 550 nm.

\* \* \* \* \*